C. EISLER.
ADJUSTABLE DRILL HEAD.
APPLICATION FILED NOV. 26, 1915.

1,246,250.

Patented Nov. 13, 1917.
2 SHEETS—SHEET 1.

WITNESSES:
Fred H. Miller
J. R. Langley

INVENTOR
Charles Eisler
BY
Robson De S. Brown
ATTORNEY

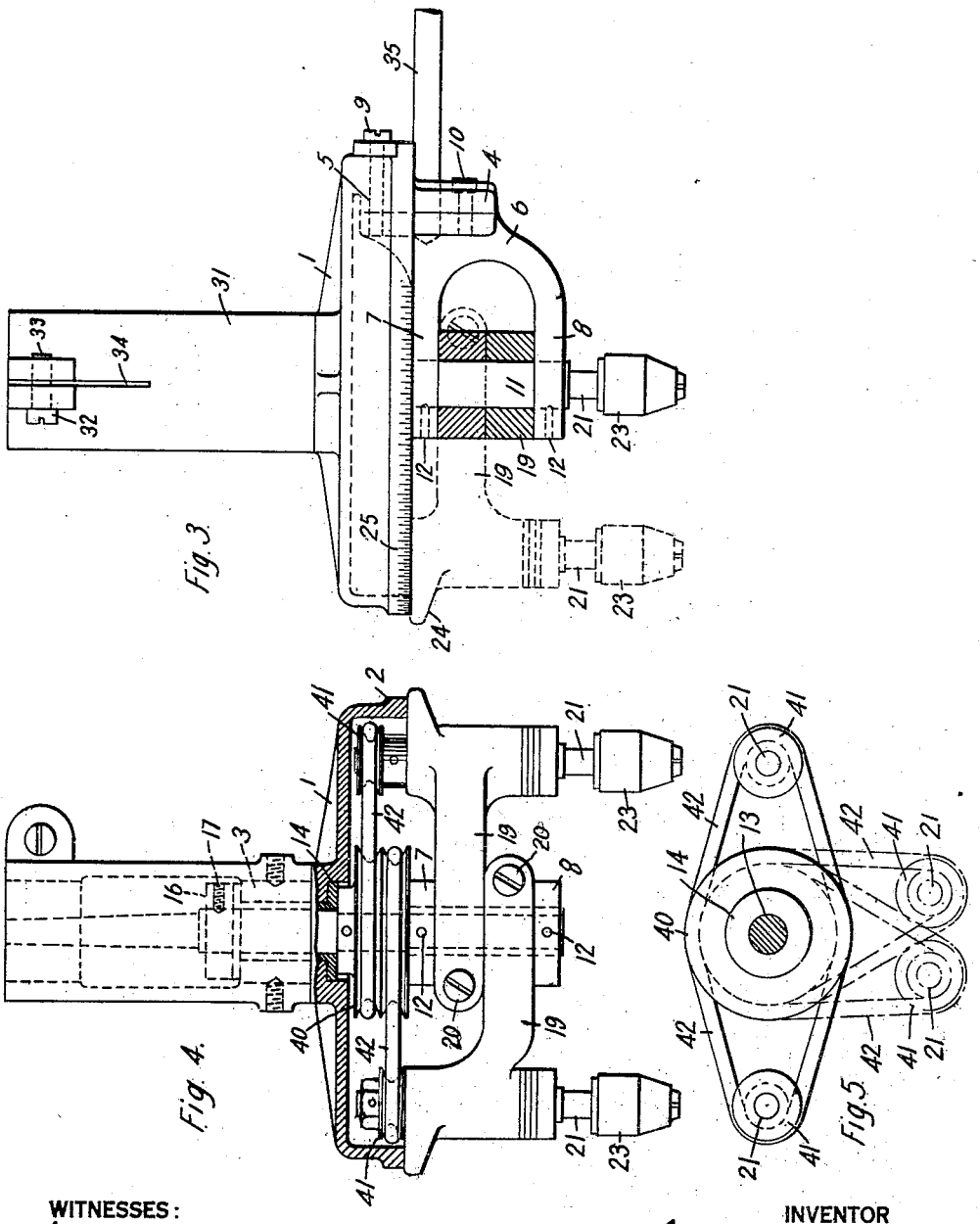

UNITED STATES PATENT OFFICE.

CHARLES EISLER, OF BLOOMFIELD, NEW JERSEY.

ADJUSTABLE DRILL-HEAD.

1,246,250.　　　　　Specification of Letters Patent.　　Patented Nov. 13, 1917.

Application filed November 26, 1915. Serial No. 63,460.

*To all whom it may concern:*

Be it known that I, CHARLES EISLER, a citizen of the United States, and a resident of Bloomfield, in the county of Essex and State of New Jersey, have invented a new and useful Improvement in Adjustable Drill-Heads, of which the following is a specification.

My invention relates to adjustable drill heads for drill presses and similar machine tools, and it has for its object to provide a drill head having one or more drill holders which shall be angularly adjustable around a common center, and which shall be driven at high speed from a single driving spindle by means of simple and substantially noiseless mechanism.

Another object of my invention is to provide an adjustable drill head of the above-indicated character in which the angular position of each drill holder with respect to its axis of adjustment may be quickly determined and accurately fixed.

Figure 1:
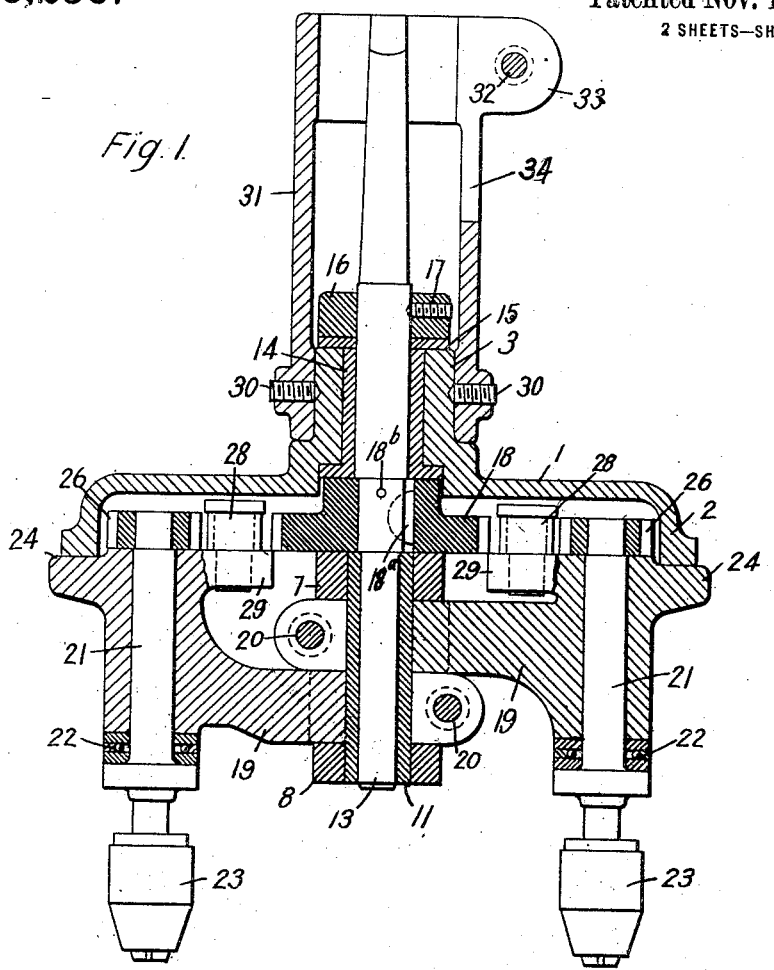
Figure 2:
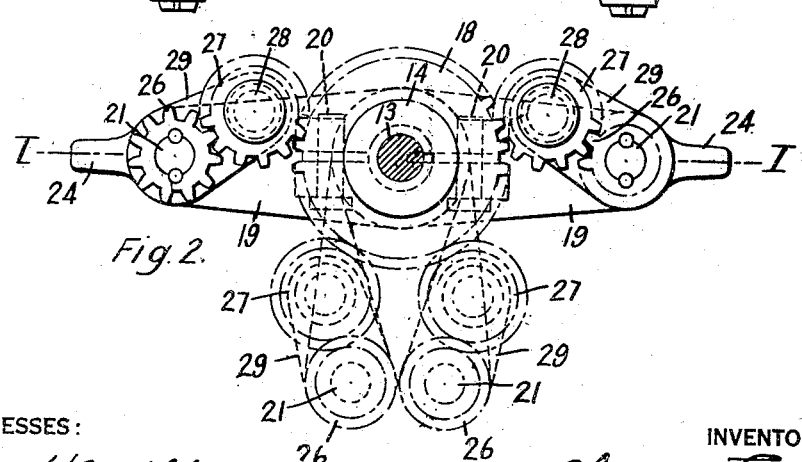

Examples of devices constructed in accordance with my invention are illustrated in the accompanying drawings, in which Figure 1 is a vertical sectional view showing a multiple-spindle drill head having gear-driven drill holders, the section being taken substantially along the line I—I, Fig. 2; Fig. 2 is a partial plan view of the device shown in Fig. 1, indicating the possible range of adjustment of the drill holders in this form of my device; Fig. 3 is a side elevational view, partly in section, of the devices shown in Figs. 1 and 4; Fig. 4 is a front view, partly in elevation and partly in section, showing a modified form of device having belt-driven drill holders or drill spindles, and Fig. 5 is a partial plan view of the form of device in Fig. 4, indicating the range of adjustment of the drill holders in this form of my device.

One type of adjustable multiple spindle drill head which has heretofore been in common use is so constructed that each drill holder is adjustable around an independent axis, which is eccentric to the axis of the main driving spindle. This arrangement necessitates a complicated set of driving gears, and the range through which the drill holders can be adjusted is relatively narrow. Furthermore, with this construction, it is difficult to maintain the centers of the drills at equal distances from the axis of the driving spindle.

According to my present invention, I overcome the foregoing disadvantages, and produce an exceedingly simple and inexpensive device, by mounting the drill holders upon arms that extend radially from a single supporting member which is coaxial with the common driving spindle and about which the several arms, with their drill holders, are independently adjustable. I also provide means for setting the drill holders accurately in any desired angular positions, for driving the several drill holders at high speeds and with a minimum of noise, and for attaching the entire device to ordinary drill presses and other forms of machine tools, all as will hereinafter more fully appear.

Referring now to Figs. 1, 2 and 3 of the drawings, 1 indicates a stationary casing member, which is preferably circular in outline and is provided with downturned outer edges 2 and with a circular central opening surrounded by a flange 3. At one point, as shown at the right of Fig. 3, the casing 1 is provided with a downwardly-extending lug 4 and with an internal boss 5. A forked bracket member 6, having vertically opposed horizontal arms 7 and 8, is attached to the adjoining flat faces of the lug 4 and the boss 5 by means of screws 9 and 10, or otherwise.

The arms 7 and 8 of the forked bracket 6 are provided with openings to receive a sleeve or annular support 11, which is maintained stationary in the bracket arms by means of set screws 12, and which is of suitable internal diameter to receive one end of a vertical main driving spindle 13. This driving spindle 13 is additionally supported in a bearing 14, suitably of bronze, which fits within the upturned flange 3 of the casing 1. A thrust washer 15 surrounds the spindle 13 above the bearing 14 and the flange 3, and the spindle is maintained in proper position by means of a take-up collar 16 secured to the spindle by means of a set screw 17. The spindle 13 also carries a driving gear 18 that is secured to the spindle by means of a semi-circular key $18^a$ and a pin $18^b$, which prevent the spindle from being withdrawn lengthwise when the parts are assembled.

Between the arms 7 and 8 of the brackets 6, the sleeve 11 supports one or more radial arms 19, two such arms being shown in the drawings. The inner end of each of these arms is divided to surround the sleeve 11, to which the arm is clamped in any selected position of angular adjustment by means of screws 20 passing through the divided ends of the arm. Each of the arms 19 carries at its enlarged outer end a drill holder consisting of a short vertical shaft or drill spindle 21 provided with thrust ball bearings 22 and carrying at its lower end a chuck 23 for receiving a drill or other rotary tool. A projection 24 from each arm 19 engages slidably with the down-turned outer edge 2 of the casing 1, and the angular position of each arm with respect to the casing and to the other arm is indicated by means of graduations 25 formed on the edge of the casing 1, as shown in Fig. 3. These graduations may be marked in any desired manner, and coöperate with a suitable mark on the projection 24 of the arm 19. The projections 24, by their engagement with the rim of the casing, also serve to take up the vertical pressure of the drills and maintain them in fixed relation to the driving shaft.

Each of the drill spindles 21 carries at its upper end a gear 26, which is driven in the same direction as the main driving spindle 13 through an intermediate idler gear 27. The idler gear 27 meshes with both of the gears 18 and 26, and is mounted on a pin 28 carried by a lug 29 which projects laterally from the arm 19, as shown in Figs. 1 and 2. In Fig. 1 the idler gears 27 are omitted for the sake of clearness.

Surrounding the flange 3 of the casing 1, and attached thereto by means of set screws 30, is a sleeve 31 which fits over the spindle sleeve of the drill press or other machine tool with which the attachment is used, and which is fastened in place by means of a screw 32 passing through tapped ears 33 which project from the upper contractile edge of the sleeve 31 adjacent to a slot 34. The sleeve 31 need not be used except when the taper of the drill press spindle is too poor to hold the attachment in place through the spindle 13, or when the attachment is to be used permanently upon the same machine. A rod 35 may also be provided for preventing rotation of the casing 1 when the sleeve 31 is not employed. This rod is received in an opening in the lug 4 and the bracket 6, as shown in Fig. 3, and is set against the drill press column or other stationary part of the machine tool.

Fig. 2 indicates the wide range of adjustment of which the individual drill holders are capable in this device. Their greatest distance apart is reached when the arms 19 are in the diametrically opposed positions shown in full lines in this figure, and their point of nearest approach is indicated in dotted lines. The arms may also be turned rearwardly for a considerable distance from their diametrical position. It will thus be seen that my device is capable of an exceedingly great number of adjustments, which may be quickly and accurately made by proper manipulation of the screws 20 and the arms 19.

The form of device shown in Figs. 4 and 5 is constructed in most of its details like the device described above, and the corresponding parts are similarly designated. This device differs, however, in the mechanism for rotating the drill spindles 21, which in this case are belt driven. The main driving spindle carries a pulley 40, which has a plurality of grooves corresponding to the grooves in smaller pulleys 41, one of which is attached to each of the drill spindles 21. Belts 42 pass around the several pairs of pulley grooves, and serve to rotate the drill spindles at high speed and with substantially no noise. The belts 42 may be either flat, round or V-shaped in cross section.

It will be observed that the attachments which I have shown and described not only provide for adjustment of the several drill spindles around a common axis, but also secure great accuracy and rigidity by receiving the upward pressure of the drills upon the stationary casing member. This is a feature of advantage over the devices in which each drill is supported at the end of a freely swinging arm. My devices are also convenient in use, being easily attached to the usual forms of machine tools. It is to be understood that the structural details which I have shown and described may be variously modified by persons skilled in the art without exceeding the limits of my invention, and that no restrictions are to be imposed upon my invention except such as are indicated in the appended claims.

I claim as my invention:

1. A drill head for drill presses and the like comprising a driving shaft, a plurality of arms that are angularly adjustable around the axis of the said driving shaft, means adjacent to the said axis for independently securing each of the said arms in positions of angular adjustment around the said axis, and a drill holder carried by each of the said arms, the said drill holders being maintained constantly equidistant from the said axis.

2. A drill head for drill presses and the like comprising a driving spindle, a plurality of arms that are independently and angularly adjustable around a common driving axis coincident with the axis of rotation of the said spindle and provided with clamping means disposed adjacent to the said axis of adjustment, and a drill holder carried by each of the said arms, the said drill holders being maintained constantly equidistant from the said axis.

3. A drill head for drill presses and the like comprising an annular support, a driving spindle extending therethrough, an arm having one end releasably clamped around the said support and extending radially therefrom, the said arm being movable coaxially with respect to the said driving spindle, a drill holder carried by the said arm, and means for driving the said drill holder from the said driving spindle.

4. A drill head for drill presses and the like comprising a driving spindle, a tubular support surrounding the said spindle, an arm having one end clamped around the said support and extending radially therefrom, the said arm being angularly adjustable around an axis coincident with the axis of rotation of the said spindle, and a drill spindle secured to the said arm.

5. A drill head for drill presses and the like comprising a driving spindle, an annular support surrounding the said spindle, an arm extending radially from the said support and angularly adjustable thereon, a drill spindle carried in a bearing that is rigidly secured to the said arm, and means for driving the said drill spindle from the said driving spindle.

6. A drill head for drill presses and the like comprising a driving spindle, an annular support surrounding the said spindle, an arm extending radially from the said support and angularly adjustable thereon, a drill spindle carried in a bearing that is integral with the said arm, and means for driving the said drill spindle from the said driving spindle.

7. A drill head for drill presses and the like comprising a driving spindle, a tubular support surrounding the said spindle, an arm having one end clamped around the said tubular support and extending radially therefrom, a drill spindle carried in a bearing that is rigidly secured to the said arm near the outer end thereof, and means for driving the said drill spindle from the said driving spindle.

8. A drill head for drill presses and the like comprising a support, a plurality of arms extending radially from the said support, a drill holder secured in a fixed bearing near the outer end of each of the said arms, and means for adjustably and independently attaching the said arms to the said support while maintaining the said drill holders constantly equidistant from a common driving axis.

9. A drill head for drill presses and the like comprising a support, a plurality of arms substantially equal in length extending from the said support and angularly adjustable thereon around a common driving axis, a drill holder secured in a fixed bearing near the outer end of each of the said arms, and means for releasably and independently securing the said arms to the said support.

10. A drill head for drill presses and the like comprising a driving spindle, a support adjacent thereto, an arm adjustably secured to the said support, the said arm being movable around the axis of the said driving spindle, and having its outer end free from attaching means, a drill holder carried by the said arm, and means for driving the said drill holder from the said driving spindle.

11. A drill head for drill presses and the like comprising a support, a driving spindle centrally carried thereby, a plurality of arms substantially equal in length and extending radially from the said support, a drill holder secured in a fixed bearing near the outer end of each of the said arms, and means for driving the said drill holders at increased speed from the said driving spindle.

12. A drill head for drill presses and the like comprising a support, a driving spindle, a plurality of arms substantially equal in length and extending radially from the said support and from the axis of the said driving spindle, a drill holder secured in a fixed bearing near the outer end of each of the said arms, means for driving the said drill holders from the said driving spindle, and means for securing the said arms independently in positions of angular adjustment around the said support, the said securing means comprising clamps at the inner ends of the said arms, the outer ends of the arms being free from attaching means.

13. A drill head for drill presses and the like comprising a substantially circular support, a plurality of arms of substantially equal lengths extending radially from and clamped around the said support, a drill holder secured to each of the said arms, means for adjustably attaching the said arms to the said support while maintaining the said drill holders substantially equidistant from a common driving axis, and means for indicating the angular positions of the said arms with respect to the said support.

14. A drill head for drill presses and the like comprising an annular support, a driving spindle extending therethrough, an arm provided with a forked portion adapted to engage the said annular support and to be releasably clamped thereto, a drill holder secured to the said arm, and means for driving the said drill holder from the said spindle.

15. A drill head for drill presses and the like comprising a support, a driving spindle rotatably carried by the said support, a sleeve surrounding a portion of the said driving spindle, arms extending radially from the said sleeve and adapted to be releasably secured thereto, means associated with the said support for maintaining the said arms in fixed longitudinal position with respect to the said sleeve, a drill holder secured to each of the said arms, and means for driving the said drill holders from the said driving spindle.

16. A drill head for drill presses and the like comprising a circular casing member provided with an upwardly extending bearing flange, a driving spindle supported in the said bearing, a downwardly and inwardly extending forked support, a sleeve received in openings in the said forked support and surrounding a portion of the said spindle, arms adjustably secured to the said sleeve, drill holders attached to the said arms, and means for driving the said drill holders from the said driving spindle.

17. A drill head for drill presses and the like comprising a driving spindle, a sleeve surrounding a portion of the said spindle, a drill holder mounted upon an arm that is angularly adjustable around the said sleeve and clamped thereto, and a belt coöperating with the spindle and with the drill holder for rotating the said drill holder.

18. A drill head for drill presses and the like comprising a driving spindle, a sleeve surrounding a portion of the said spindle, an arm adjustably clamped to the said sleeve, a drill holder comprising a shaft parallel to the said spindle and movable with the said arm, pulleys secured respectively to the said spindle and to the said shaft, and a belt passing around the said pulleys.

19. A drill head for drill presses and the like comprising a driving spindle, a sleeve surrounding a portion of the said spindle, an arm having a forked portion adapted to be releasably clamped to the said sleeve, a drill holder comprising a shaft displaced from the said spindle and carried by the said arm, pulleys secured respectively to the said spindle and to the said shaft, and a belt passing around the said pulleys.

In testimony whereof, I have hereunto subscribed my name this 18th day of November, 1915.

CHAS. EISLER.

Witnesses:
F. T. CRAMER,
H. M. BRADLEY.

Copies of this patent may be obtained for five cents each, by addressing the "Commissioner of Patents, Washington, D. C."